United States Patent
Cappetta et al.

[11] 3,845,665
[45] Nov. 5, 1974

[54] TESTING METHOD AND APPARATUS FOR SIMULATING ACCELERATION FUNCTIONS

[75] Inventors: Joseph G. Cappetta, Dover; Steven H. Langdo, Newton, both of N.J.

[73] Assignee: The United States of America as represented by the Secretary of the Army, Washington, D.C.

[22] Filed: Nov. 9, 1973

[21] Appl. No.: 414,563

Related U.S. Application Data

[63] Continuation-in-part of Ser. No. 247,380, April 25, 1972, abandoned.

[52] U.S. Cl. .................. 73/432 SD, 73/1 D, 73/12
[51] Int. Cl. ........................................... G01m 9/00
[58] Field of Search ........ 73/1 D, 1 DC, 12, 432 SD

[56] References Cited
UNITED STATES PATENTS

| | | | |
|---|---|---|---|
| 3,216,237 | 11/1965 | Feder | 73/1 DC |
| 3,466,932 | 9/1969 | Schulman | 73/432 SD |

FOREIGN PATENTS OR APPLICATIONS

| | | | |
|---|---|---|---|
| 649,712 | 9/1928 | France | 73/147 |

*Primary Examiner*—James J. Gill
*Attorney, Agent, or Firm*—Eugene E. Stevens, III; Herbert Berl; Thomas R. Webb

[57] ABSTRACT

A testing method and apparatus for simulating acceleration functions experienced by a missile or a projectile during launch. The method comprises the steps of mounting a test piece on a test fixture so that its normal flight axis is perpendicular to the fixture's direction of travel, propelling the loaded test fixture along a straight path until a desired level of speed is obtained, guiding the fixture into an arcuate path, maintaining the speed of the test fixture constant while in the arcuate path, guiding the test fixture along a second straight path which forms a continuation of the first arcuate path, maintaining the speed of the test fixture and the test piece affixed thereto constant while traversing the second straight path, guiding the test fixture into a helical path, maintaining the speed of the fixture and the test piece constant while in the helical path, while maintaining constant speed for a number of revolutions depending upon the duration of the radial acceleration desired. The test piece is held in a rolling test fixture which is initially propelled within a rectangular shaped closed track by a blast of compressed air. The speed of the test fixture is adjusted in the straight sections by a plurality of controlled motordriven belt-type friction stabilizers which synchronize the speed of the test fixture with the speed in centrifuge sections located in an arcuate path and helical path.

8 Claims, 5 Drawing Figures

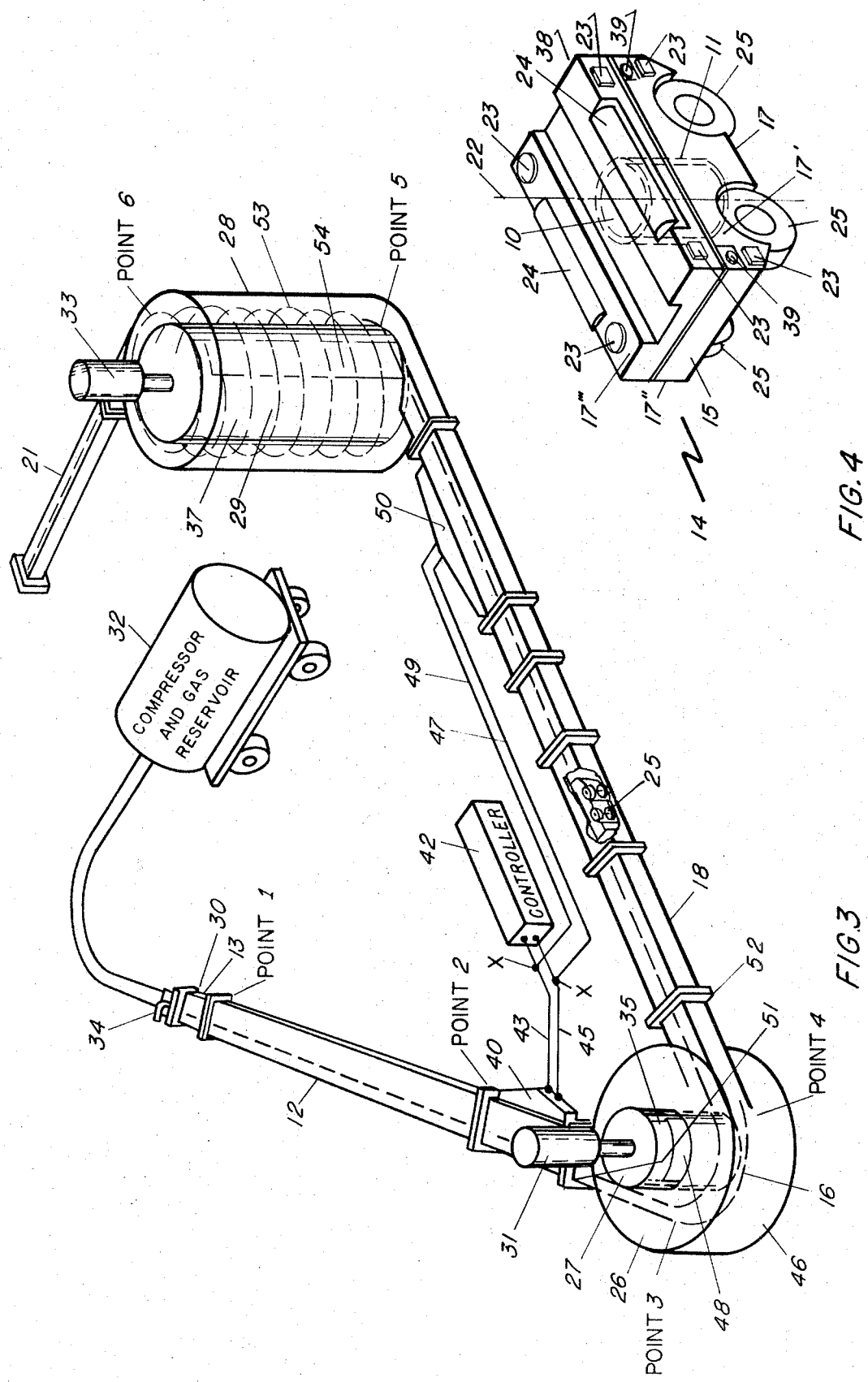

TESTING METHOD AND APPARATUS FOR SIMULATING ACCELERATION FUNCTIONS

This application is a continuation-in-part of prior application Ser. No. 247,380 filed on Apr. 25, 1972 of Joseph G. Cappetta and S. H. Langdo for Method of Simulating Acceleration Functions, now abandoned.

GOVERNMENTAL INTEREST

The invention described herein may be manufactured, used and licensed by or for the Government for governmental purposes without the payment to us of any royalty thereon.

BACKGROUND OF THE INVENTION

The present invention relates to techniques of acceleration simulation and more particularly to a testing method and device for simulating acceleration functions having fast rise and fall times, e.g., 15 g's per millisecond.

Existing methods of acceleration testing are centrifuge testing and linear (rocket sled) testing. Centrifuge testing, while capable of achieving sufficiently high radial acceleration level, cannot simulate the high rates of acceleration change such as occurs in a multistage rocket acceleration. When such a simulation is attempted with a centrifuge, abnormally high out-of-plane acceleration is generated. Furthermore, the design of such equipment involves difficult synchronization problems and the use of heavy duty drive elements due to the high torque loadings required.

Linear acceleration testing, such as achieved on a rocket sled, is prohibitively expensive, and requires an extensive track length, thereby precluding use within a laboratory. Since the speeds used are supersonic, high thrust levels are necessary to overcome air resistance, and provisions must be made to contend with the sonic "boom" produced thereby.

The invention described herein is capable of achieving extremely high rate-of-change, multistage, accelerations without the introduction of abnormal out-of-plane accelerations, or requiring heavily designed and accurately synchronized mechanical elements. Power and space requirements are minimal. Linear speed need not exceed 50 miles per hour, for most applications.

SUMMARY OF THE INVENTION

Transverse accelerations are produced on a test piece by the present device by forcing the test piece to follow a curved path at constant tangential speed. In order to achieve high rates of change without introduction of high out-of-plane accelerations, or requiring large power sources, the test piece is gradually accelerated along a linear path to operating speed prior to entering the curved portion of the path. The rate of change in acceleration is then dependent upon the rate of transition between linear and curved paths, e.g., an abrupt change in radius will result in a near instantaneous change in radial acceleration.

An object of the present invention is to provide a testing method for simulating the acceleration environment of a multistage hypersonic missile during launch and flight.

Another object is to provide a testing method of simulating a wide variety of acceleration functions and applying said functions to a test piece.

A further object of the present invention is to provide a test fixture and test track which permits a test piece to be placed in an acceleration environment which simulates upon the test piece the forces experienced by components of a multistage hypersonic missile during launch and flight.

For a better understanding of the present invention together with other and further objects thereof reference is made to the following description taken in connection with the accompanying drawings.

BRIEF DESCRIPTION OF THE DRAWINGS

FIG. 3 is a schematic and isometric view of the track system used in the method of simulating acceleration functions.

FIG. 4 is an isometric view of a test fixture used in the track system of FIG. 3.

DETAILED DESCRIPTION OF THE INVENTION

Figure 1:
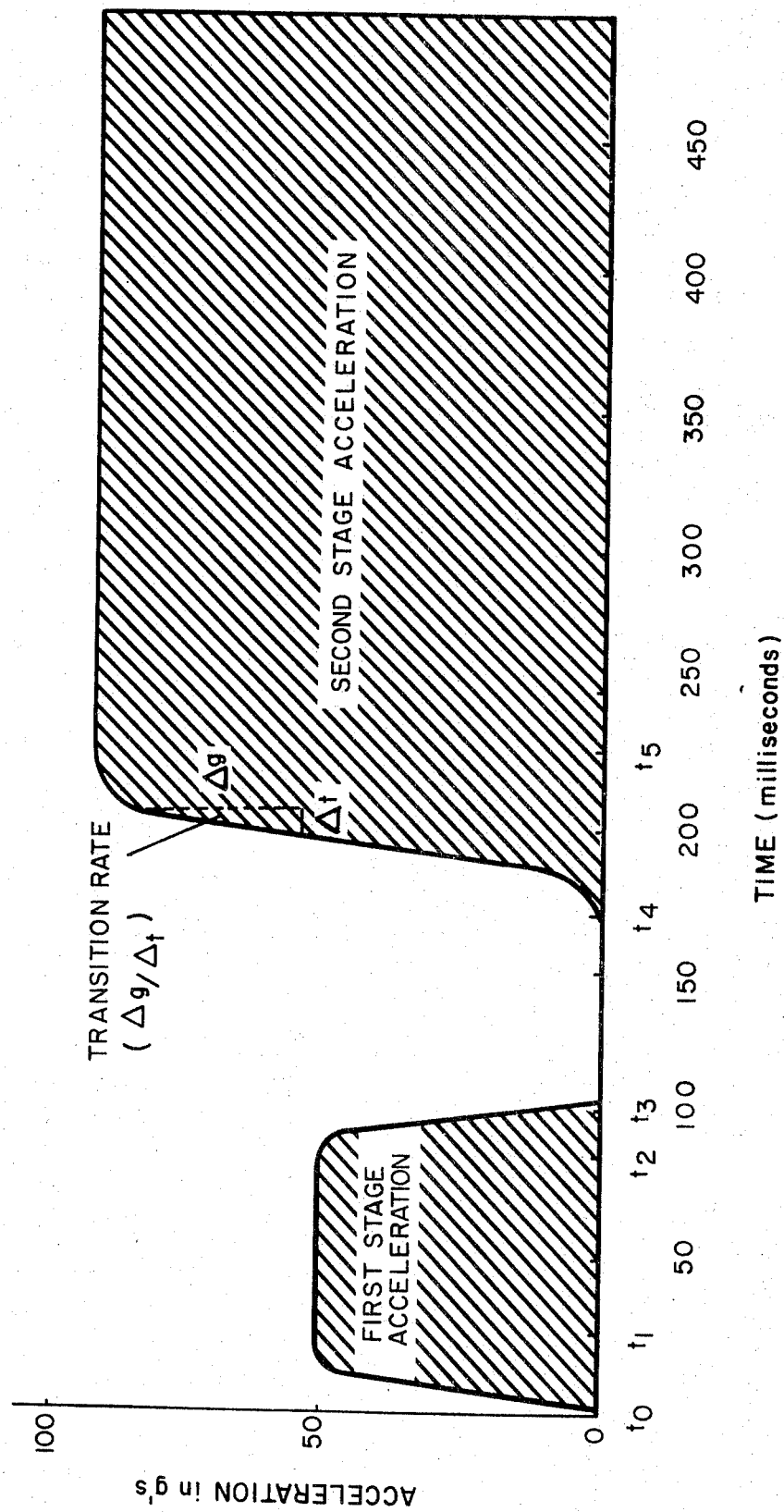
FIG. 1 is a diagram of a typical acceleration versus time of the acceleration of a two stage missile or projectile.
Figure 2:
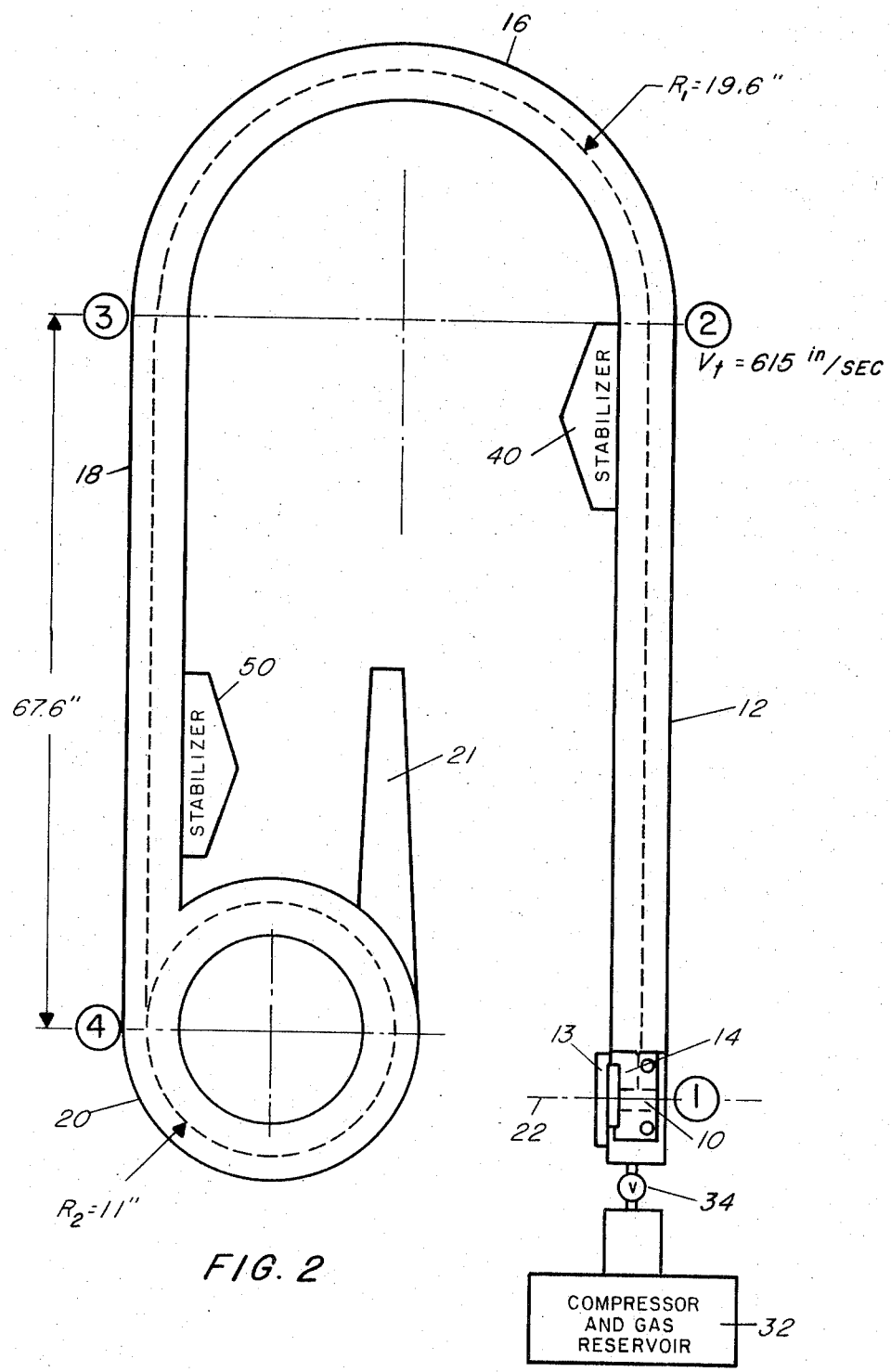
FIG. 2 is a diagram of a track layout used in one embodiment of the present method to simulate the acceleration-time profile of FIG. 1.

Referring now to FIGS. 1 and 2 a test piece 10, weighing approximately one pound, and is carried by a carriage-type test fixture, is propelled and caused to accelerate from point 1 to point 2 along a linear track section 12 from a linear speed of zero to 615 in./sec. This is accomplished by opening up a valve 34 so that a gas reservoir 32 can suddenly release its pressurized gas against the end of test fixture 14, causing it to be propelled along track 12. Test piece 10 maintains this speed with the aid of first stabilizer 40 as it is carried by test fixture 14 into a circular path having a radius $R_1$ of 19.6 inches. The test fixture 14 rides an arcuate track section 16, and has a tangential speed which is maintained constant in magnitude from point 2 through point 3. A plot of the radial acceleration of forces applied to the test piece 10 is shown on FIG. 1. The rise time $t_0$ through $t_1$, is the time that it takes for the test piece to go through point 2. From $t_1$ through $t_2$ on FIG. 1 and from point 2 through point 3 on FIG. 2, the test piece 10 is subjected to a constant radial acceleration of 50 g. As the test piece leaves point 3, on FIG. 2, it experiences a rapid decrease in radial acceleration as illustrated by the fall time $t_2$ through $t_3$ on FIG. 1. While the test piece 10 traverses the second linear track section 18 between points 3 and 4 on FIG. 2, the speed is corrected to 615 in./sec., making up for frictional losses, by a stabilizer 50 located at the end of track length 18. The purpose of this correction is to assure smooth entry, at the required operating velocity, into the helical path 20. During the latter period, as shown on FIG. 1 from $t_3$ through $t_4$, the test piece 10 is experiencing no radial accelerating forces. At point 4, in FIG. 2, the test piece enters an arcuate track 20 having a radius $R_2$ of 11 inches. The transition rate of change of acceleration upon the test piece 10 beyond point 4 during the period of time $t_4$ through $t_5$ is represented by the ratio of the differential increments $\Delta g / \Delta t$. The radial accelerating force placed upon the test piece 10 from $t_5$ onward will be approximately 90 g. The time duration of this acceleration is dependent upon the number of revolutions the test piece 10 is allowed to make on the 11 inch radius track 20 while maintaining constant speed of 615 inches/sec., prior to exiting to brake section 21.

Referring to FIGS. 3 and 4, test fixture 14 houses the test piece 10 in a cavity 11 so that its normal flight velocity axis 22 is perpendicular to the direction of test fixture travel and aligned so that the radial acceleration experienced in the curved track sections is applied in the normal direction of flight acceleration. The test fixture 14, comprises a rectangularly shaped body 15 which has four wheels 25, rotatably attached to the bottom 17 of body 15, which ride against one side surface of the inner wall of the rectangular track. Adjustable brake pucks 39 are located on body sides 17' and 17'' for engaging a terminal brake track section 21 which decelerates the test fixture or carriage 14. Slide pads 23 are positioned on body sides 17', 17'' and top 17'''' to guide the test fixture 14 within the track sections 12, 44, 48 and 52 and to reduce frictional sliding losses between test fixture 14 and the aforedescribed track sections. A pair of rollers 24, longitudinally positioned on top 17''' of the test fixture 14, are provided for transmittal of speed sustaining forces, while allowing translation of the test fixture, in first and second helical centrifuge sections, 26 and 28, respectively.

The launcher or first straight path track section 12, as shown in FIG. 3, is made of rectangularly-shaped tubular form whose inside cross section is slightly larger than the outside cross section of the test fixture 14. Launcher track section 12 purpose is to accelerate the test fixture 14 to a specific end speed which is closely matched to the tangential speeds of the first and second helical centrifugal section 26 and 28, respectively. Test fixture 14 is placed within the launcher track 12 through a hinged loading door 13 which is attached to the side of the launcher 12. The rear end 30 of the launcher 12 is pneumatically connected to an air compressor and a pneumatic reservoir 32 through an intermediate quick opening valve 34. Prior to launch of the test fixture 14, quick opening valve 34 is placed in its closed position and reservoir 32 is charged with air at a predetermined pressure corresponding to the desired launch speed (Vo). Acceleration of the carriage 14 to Vo is achieved between points 1 and 2 on FIG. 3 by the instantaneous application of pneumatic pressure to the rear end 38 of test fixture 14 when the release valve 34 is snapped open.

Figure 5:
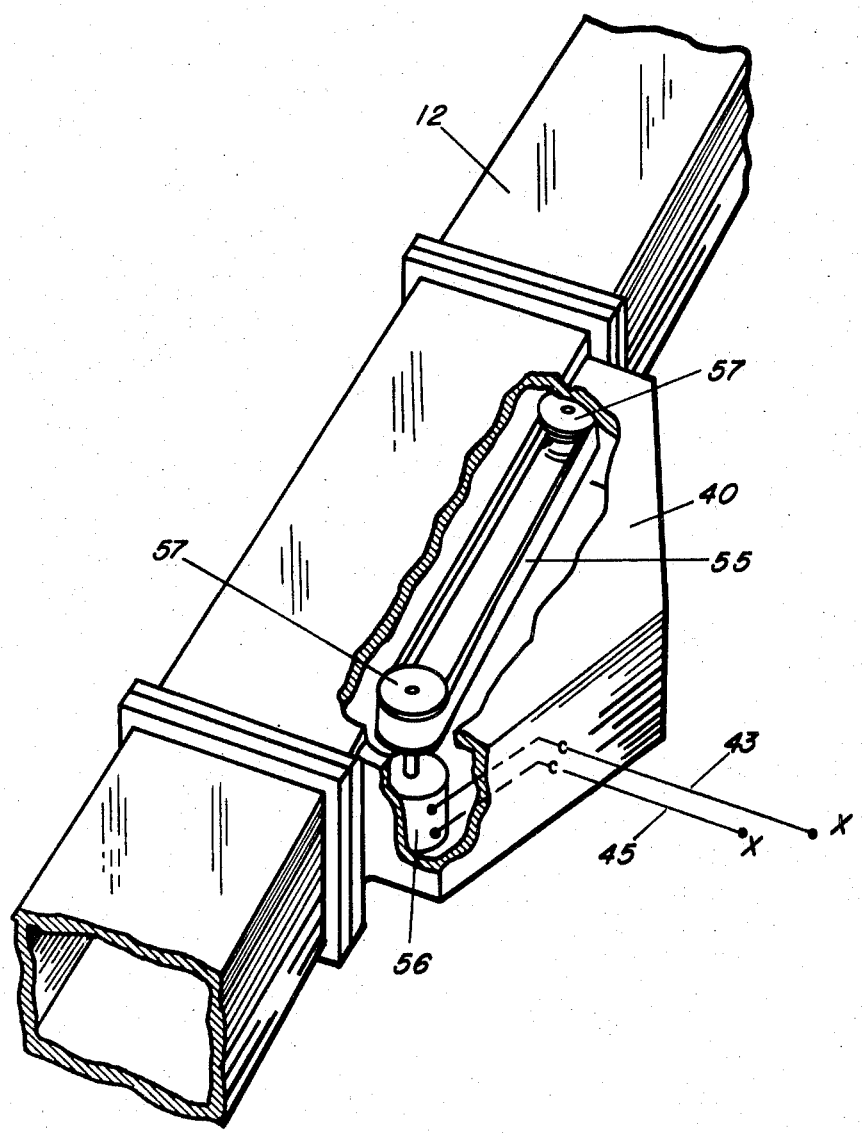
FIG. 5 is a partial cutaway isometric view of a stabilizer used in the first linear track section in FIG. 3.

Stabilizers 40 and 50 are used to synchronize the speed of the test fixture 14 with the tangential speed in the first and second centrifugal sections 26 and 28 prior to the test fixture's engagement with motor driven centrifuge drums 27 and 29, respectively, located in sections 26 and 28. The first stabilizer 40, as shown in FIG. 5, has a motor driven belt 55 which rides on a pair of guide pulleys 57, and the belt 55 frictionally engages the test fixture rollers 24. An electronic controller 42 is electrically connected by leads 43 and 45 to first stabilizer 40. Controller 42 regulates the RPM of the motors 56 contained within the first and second stabilizers 40 and 50, in order to synchronize the speed of belt 55 with the tangential speed of the centrifuge drums 27 and 29.

Drum 27, in frictional contact with rollers 24, is driven by motor 31 and maintains the speed of the test fixture 14 constant for a fixed period of time, thereby simulating the first stage acceleration shown in FIG. 1.

Centrifugal section 26 includes an input port 51 which is connected to stabilizer 40, an output port 52 connected to track 18, and a helical section of track 16 along which the test fixture 14 is confined to travel. Concentric with the helical section of track 16 is the aforedescribed powered drum 27 which is rotatably supported within the cylindrically shaped housing 46. The powered drums 27 and 29 have their outer cylindrical surfaces 35 and 37 respectively faced with rubber so that they can frictionally contact and drive rollers 24 in their axial direction through openings 48 and 54 in the inner walls of tracks 16 and 53. The rotational velocity ($W_1$) of drum 27 is adjusted by means of motor 31 so that the drum tangential speed corresponds to the desired radial acceleration $A_1 = V_1^2/R_1$ of the entering test fixture 14. In the above equation $A_1$ equals the first stage acceleration shown in FIG. 1, $R_1$ equals radius of the drum, and $V_1$ is the velocity of the carriage and the test piece. As the test fixture 14 enters the helical track section at point 3, FIG. 3, it is subjected to a radial acceleration ($A_1$) due to the fact that it is now forced to follow a helical path. Centrifugal forces are transmitted to the test fixture 14 through wheels 25 which are in contact with the outer side wall of track 16. The rotating rubber-faced drum 27 frictionally engages test fixture rollers 24 and drives test fixture 14 in track 16 so that its tangential speed is maintained constant in spite of any aerodynamic or frictional losses between the test fixture 14 and the track 16. As the test fixture 14 travels through track 16 it must be free to move in a direction parallel to the axis of the drum 27. This freedom of motion is provided for by the test fixture rollers 24. At point 4, FIG. 3, test fixture 14 leaves its helical path and again travels along a second straight-path track section 18. At this point of test fixture 14 travel, the radial or transverse acceleration drops to zero thus completing the simulation of the first acceleration stage. The function of the second straight path track section 18 is to provide an exchange path between the first and second helical centrifuges 26 and 28 and a time delay which corresponds to the time $t_3$ and $t_4$ on FIG. 1. During the aforementioned period, the test fixture 14 experiences zero radial acceleration since it is traveling in a straight path.

Second stabilizer 50 is located just prior to the entrance of the second helical section 28. Second stabilizer 50 has a similar function and is of the same mechanical construction as aforedescribed for the first stabilizer 40. Second stabilizer 50 is regulated by controller 42 and electrically coupled thereto through leads 47 and 49 from points X—X.

At point 5, FIG. 3, drum 29 of the second helical centrifugal section 28, driven by motor 33, radially accelerates the test fixture 14 and maintains the speed constant for a fixed period of time which corresponds to the second stage acceleration shown in FIG. 1. The design of second helical centrifugal section 28 is similar to the design of centrifugal section 26 except that it has a helical track 53 with a plurality of turns which corresponds to the desired duration of second stage acceleration. At point 6, FIG. 3, the second stage helical track 53 exits into brake section 21.

From the aforementioned description it may be seen that the invention provides a relatively simple, practical and inexpensive method for attaining acceleration simulation of a missile launch wherein operating parameters, such as radius and speed, may be easily calculated and on a scale which can easily be applied to laboratory use. The method has the advantage of offering a closer simulation of the acceleration-time curve of a missile launch, since the track may be made in interchangeable sections which can be selected and assembled to give a wide variety of acceleration-time-curves.

The foregoing disclosure and drawings are merely illustrative of the principles of this invention and are not to be interpreted in a limiting sense. I wish it to be understood that I do not desire to be limited to the exact details of construction shown and described for obvious modifications will occur to a person skilled in the art.

Having thus fully described the invention, what is claimed as new and desired to be secured by Letters Patent of the United States is:

1. A testing method for simulating on a test piece acceleration environments characterized by the rapid turn on and off of a plurality of acceleration pulses which comprises:
   mounting said test piece in a test fixture so that its normal flight axis is perpendicular to the direction of travel of said fixture;
   propelling said fixture along a first linear path from a stationary position to a predetermined speed at the end of said path;
   guiding said fixture having said speed into an arcuate path;
   maintaining the speed of said test piece constant while said test piece is in said arcuate path so that said test piece has a constant radial acceleration;
   guiding said test piece along a second linear path which forms a continuation of said arcuate path;
   synchronizing the speed of said test piece with said predetermined speed at the ends of said first and second linear paths;
   guiding said test piece into a circular helical path;
   maintaining the speed of said test piece constant while said test piece is in said helical path for a number of revolutions depending upon a duration of constant radial acceleration simulation desired.

2. Testing apparatus for simulating said acceleration environments which comprises:
   mounting means for holding said test piece so that its normal flight axis is perpendicular to the direction of travel of said mounting means;
   means for propelling said mounting means along a first linear path from a stationary position to a predetermined speed at the end of said path;
   first means for guiding said mounting means having said speed into an arcuate path;
   first means for maintaining said velocity of said test piece constant while said test piece is in said arcuate path so that said test piece has a constant radial acceleration;
   second means for guiding said test piece along a second linear path;
   stabilizer means for synchronizing the speed of said test piece to said predetermined speed at the ends of said first and second linear paths;
   third means for guiding said test piece into a circular helical path; and
   means for maintaining the speed of said test piece constant while said test piece is in said circular helical path for a number of revolutions depending upon a duration of a constant radial acceleration simulation desired.

3. An apparatus as recited in claim 2 wherein said mounting means comprises:
   a carriage having a plurality of wheels mounted on the bottom of said carriage, a pair of longitudinally-positioned rollers on the top of said carriage, a plurality of slide pads located on the sides and top of said carriage for reducing the frictional losses, said carriage having a cavity for holding said test piece therein.

4. An apparatus as recited in claim 2 wherein said means for propelling comprises:
   an air compressor having a gas reservoir connected thereto;
   a quick opening valve having one end pneumatically connected to said air compressor for rapidly releasing air therefrom;
   a first rectangular tubular linear track section having one end connected to the other end of said quick opening valve;
   a hinged loading door attached to said linear track which permits said mounting means to be inserted therein.

5. An apparatus as recited in claim 2 wherein said first guiding means comprises:
   a cylindrical housing having rectangular tubular input and output port sections connected thereto;

an arcuate tubular track of rectangular cross section supported in said housing intermediate said input and output ports and communicating therewith, said arcuate track having an opening in the inner arcuate track wall;

6. An apparatus as recited in claim 2 wherein said first means for maintaining velocity comprises:
   a cylindrically-shaped drum concentrically supported in said housing and having a peripheral surface which protrudes through said opening of said arcuate track, said surface contacting said rollers of said carriage as said carriage passes through said arcuate track;
   a motor connected to said drum rotating said drum, which in turn frictionally drives said carriage so that said test piece will have said constant radial acceleration impressed thereon.

7. An apparatus as recited in claim 2 wherein said stabilizer means comprises:
   a pair of rotatably supported pulleys;
   an endless belt engaging said pulleys and frictionally contacting said rollers of said mounting means;
   an electric motor connected to said pulleys for rotating said pulleys to move said belt;
   an electronic controller connected to said motor for adjusting the speed of said motor and to synchronize the speed of said belt and said mounting means with the tangential speed of said test piece in said first and third guiding means.

8. An apparatus as recited in claim 2, further comprising means for braking said mounting means when said mounting means exits from said helical path.

* * * * *